May 20, 1952 — M. W. KENNEY ET AL — 2,597,803
AUTOMATIC PHONOGRAPH
Filed Feb. 2, 1946 — 6 Sheets-Sheet 1
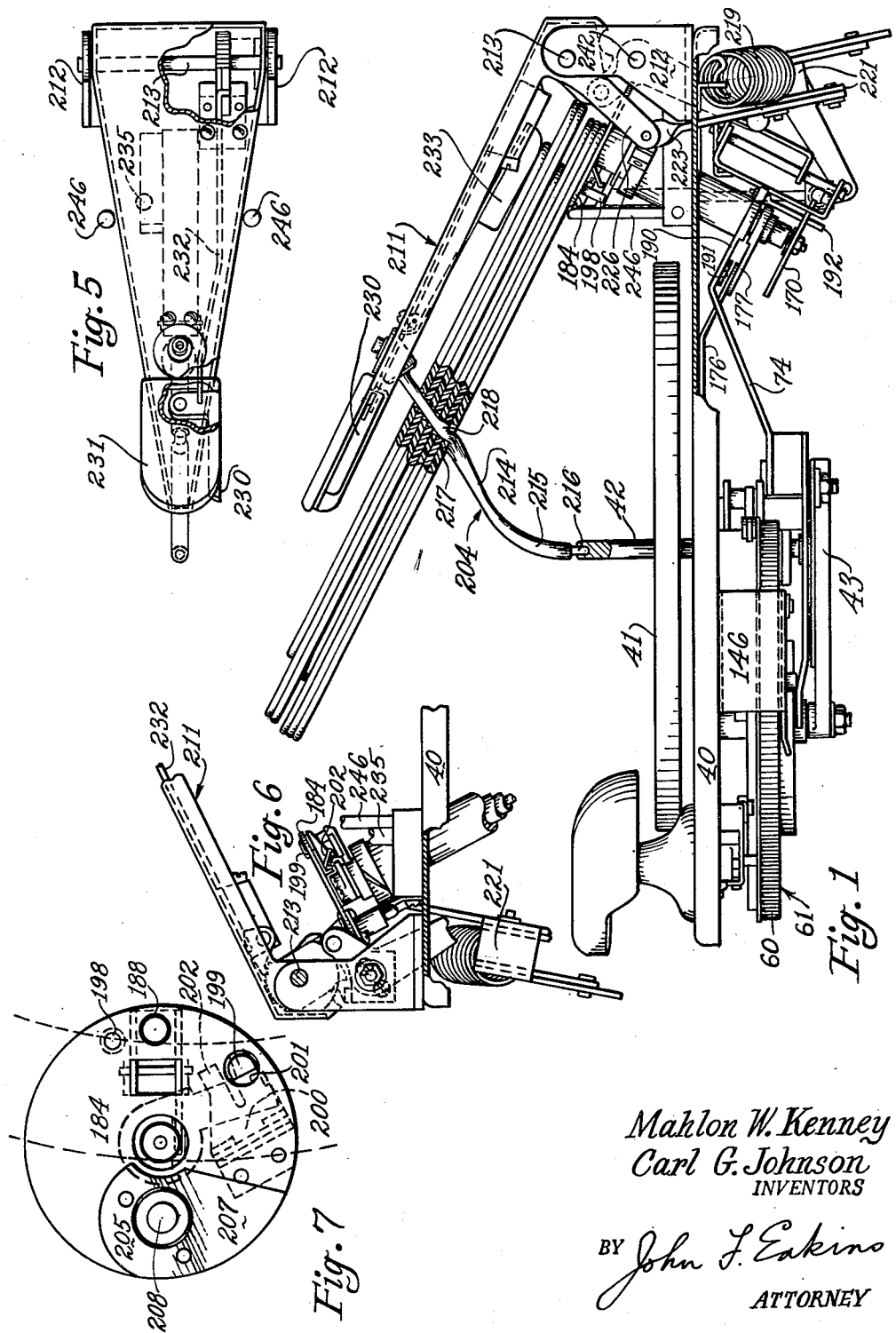
Mahlon W. Kenney
Carl G. Johnson
INVENTORS
BY John L. Eakins
ATTORNEY May 20, 1952     M. W. KENNEY ET AL     2,597,803
AUTOMATIC PHONOGRAPH
Filed Feb. 2, 1946     6 Sheets-Sheet 3

Mahlon W. Kenney
Carl G. Johnson
INVENTORS

BY John F. Eakins
ATTORNEY

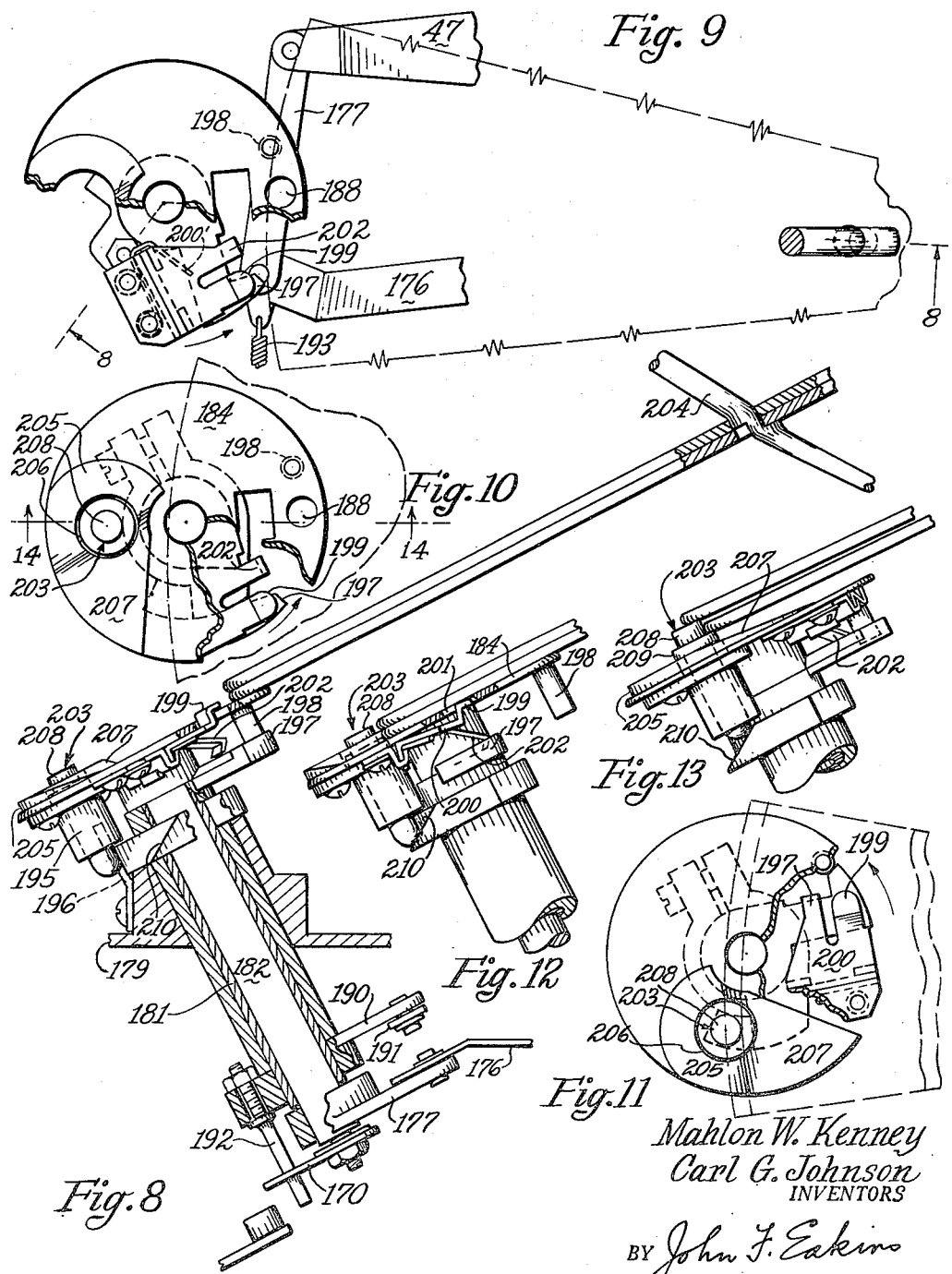

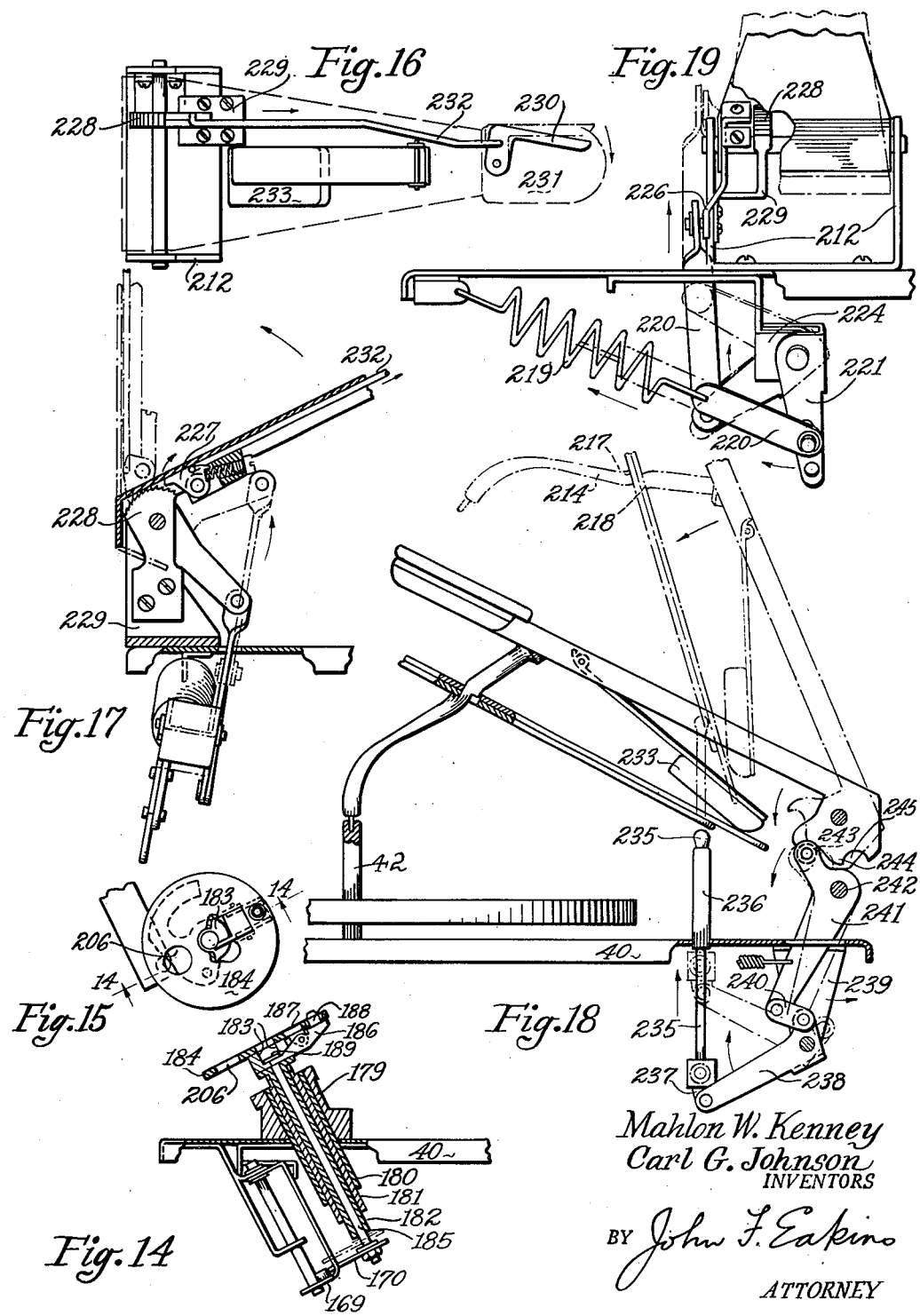

May 20, 1952 — M. W. KENNEY ET AL — 2,597,803
AUTOMATIC PHONOGRAPH
Filed Feb. 2, 1946 — 6 Sheets-Sheet 6
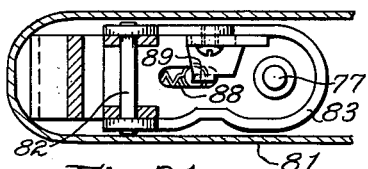
Fig. 21
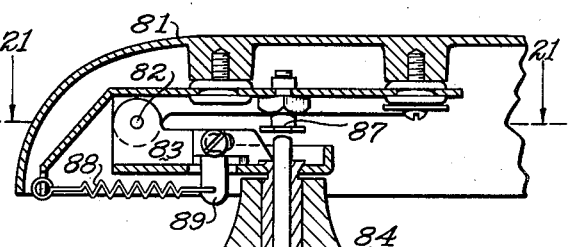
Fig. 20
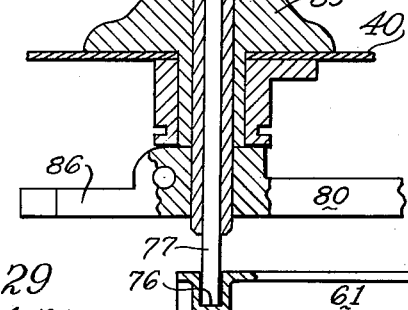
Fig. 24
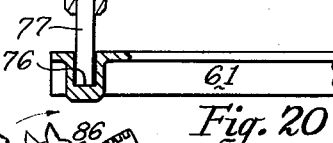
Fig. 25
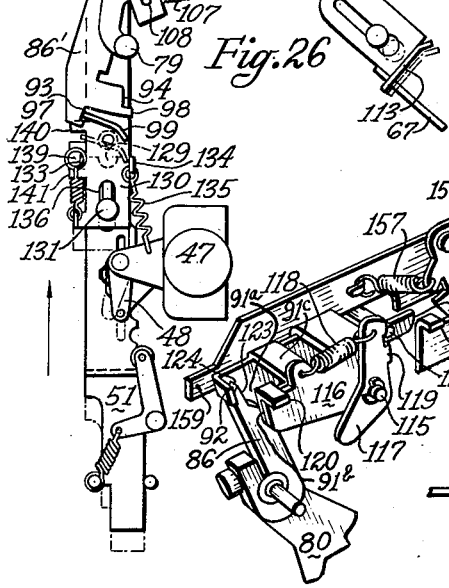
Fig. 26
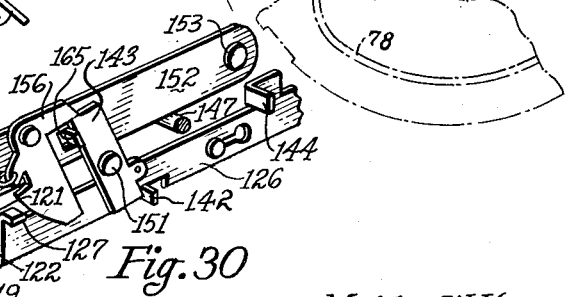
Fig. 30
Fig. 27
Mahlon W. Kenney
Carl G. Johnson
INVENTORS
BY John F. Eakins
ATTORNEY Patented May 20, 1952

2,597,803

UNITED STATES PATENT OFFICE 2,597,803

AUTOMATIC PHONOGRAPH

Mahlon W. Kenney, Oak Park, and Carl G. Johnson, Chicago, Ill., assignors to J. P. Seeburg Corporation, Chicago, Ill., a corporation of Illinois Application February 2, 1946, Serial No. 645,110

10 Claims. (Cl. 274—10)

This invention relates to automatic phonographs of the so-called record changing type in which records are automatically dropped one at a time on to a turntable for reproduction.

One of the objects of the present invention is to provide an improved machine of this type which is adapted automatically to play a series of intermixed records of different sizes, for example, conventional ten and twelve inch records.

The present invention more particularly relates to the type of record changer in which the stack of records to be played is supported on a step on a post or spindle which extends downwardly towards the center of the turntable. Means are provided for displacing the lowermost record of the stack so that it is free to move downwardly on to the turntable. This displacing means is associated with a lateral supporting member which supports the stack at a marginal portion thereof. This supporting means underlies a small portion of a smaller size record but since the records in the stack are concentric the supporting means extends more than an inch below a record of larger size in the case that the records are of ten and twelve inch diameters. It will therefore be understood that a slight displacement of a ten inch record of the lowermost position clears it from the supporting means but it is a considerable problem to release a twelve inch record since a much greater displacement of the supported edge is necessary and the weight of the records above the lowermost record tends to maintain the lowermost twelve inch record in its initial plane. This is particularly true when one or more twelve inch records is or are immediately above the lowermost twelve inch record.

We have solved this problem by making the post immediately below the step oblique so that it inclines downwardly at an angle away from the lateral supporting means so that the downward movement of the center of the record after it clears the step tends to remove the record away from the supporting means, and by elevating the discharging twelve inch record at the location of its marginal support so as to provide clearance between the lowermost large record and the supporting means. We preferably provide means for raising a twelve inch record immediately above the twelve inch record being discharged so that the marginal portion of the lowermost record which was initially supported by the supporting means is completely clear of the supporting means and the next highest large record so that the discharging large record is free for angular movement relative to the supporting means and consequently is freely withdrawn from the supporting means by movement of its center down the oblique portion of the post. In the case that the next highest record is a ten inch record the lowermost twelve inch record is free to deflect during its discharge from its initial position on the supporting means without elevating the superior records.

It is the principal object of the present invention to provide simple and effective means for effecting such manipulations of the records.

Another object of the invention is to provide a machine of this general type which can be very readily and efficiently loaded and unloaded.

It is a further object of the present invention to provide a phonograph of this general type in which the post which supports the records is carried by a frame which can be swung to raise the post away from the spindle of the turntable for loading and to provide counter-balance means and means to prevent the stack of records from being subjected to shocks and jars due to mishandling during loading.

A further object of the invention is to provide a record magazine including a post carried by a swinging frame and automatic means for guiding the records on to an auxiliary supporting surface during the loading operation.

A further object of the invention is to provide an improved mechanism for automatically locating the tone arm at the initial playing position for a record of the size which has been dropped.

Another object of the invention is to provide an improved mechanism for stopping the phonograph motor after all the records have been reproduced.

Other objects, advantages and capabilities of the invention will appear from the following description of a preferred embodiment thereof taken in conjunction with the accompanying drawings, in which Figure 1 is a side elevation of a phonograph embodying the invention;

Fig. 5 is a plan view of the magazine elements;

Fig. 6 is a fragmentary elevation of the lateral record supporting means and associated parts;

Fig. 7 is a normal plan view of the lateral record supporting means, the normal positions of a ten and twelve inch record thereon being indicated in dotted lines;

Fig. 8 is a fragmentary elevational view partly in section taken on the line 8—8 of Fig. 9, showing the manner in which records of smaller size are supported on the post shelf and on the lateral supporting means;

Fig. 9 is a plan view normal to the lateral supporting means, of the mechanism shown in Fig. 8;

Fig. 10 is a normal plan view of the lateral supporting means similar to Fig. 7 and partly broken away to disclose mechanism normally hidden by the supporting means;

Fig. 11 is a view similar to Fig. 10 showing the supporting means displacing a record of larger size in the lowermost position and elevating a record of larger size immediately above it;

Fig. 12 is a fragmentary elevational view corresponding to Fig. 10;

Fig. 13 is a similar view corresponding to Fig. 11;

Fig. 14 is a sectional view taken on the line 14—14 of Fig. 10 showing the lateral supporting means and the mechanism associated therewith for stopping the motor when the last record has been played;

Fig. 15 is a plan view of the mechanism shown in Fig. 14 as viewed normally to the lateral supporting means;

Fig. 16 is a plan view of the magazine frame similar to Fig. 5, the frame being shown in phantom to illustrate mechanism on its underside.

Fig. 17 is a fragmentary sectional elevation showing the mechanism adjacent the pivotal mounting of the magazine frame, the normal position of the magazine frame being shown in full lines and its extreme loading and unloading position being shown in phantom.

Fig. 18 is a skeleton view partly in section of the magazine frame and associated elements, the normal operating position of the frame being shown in full lines and an intermediate position of the loading operation being illustrated in phantom;

Fig. 19 is an elevational view partly broken away of the mechanism shown in Fig. 17 as viewed from the left;

Fig. 20 is a vertical section through the mounted end of the tone arm and associated parts;

Fig. 21 is a fragmentary plan view taken on the line 21—21 of Fig. 20, the player arm being shown in phantom;

Fig. 24 is a fragmentary sectional elevation of the cam gear, associated pinion and the latch which is tripped to initiate operation of the cam gear;

Fig. 25 is a fragmentary inverted plan view of the cam gear and associated parts showing the manner in which the tripped latch is relatched;

Fig. 26 is an inverted plan view showing the control bar and associated parts in "manual" position, the "off" position being shown in phantom.

Fig. 27 is a fragmentary sectional elevation showing the manner in which the trip latch is held against tripping during "manual" operation;

Fig. 29 is a perspective view of the underside of the control bar and elements associated therewith; and Fig. 30 is a perspective view of the underside of the player arm locking elements and part of the mechanism for stopping the motor.

Figure 3:
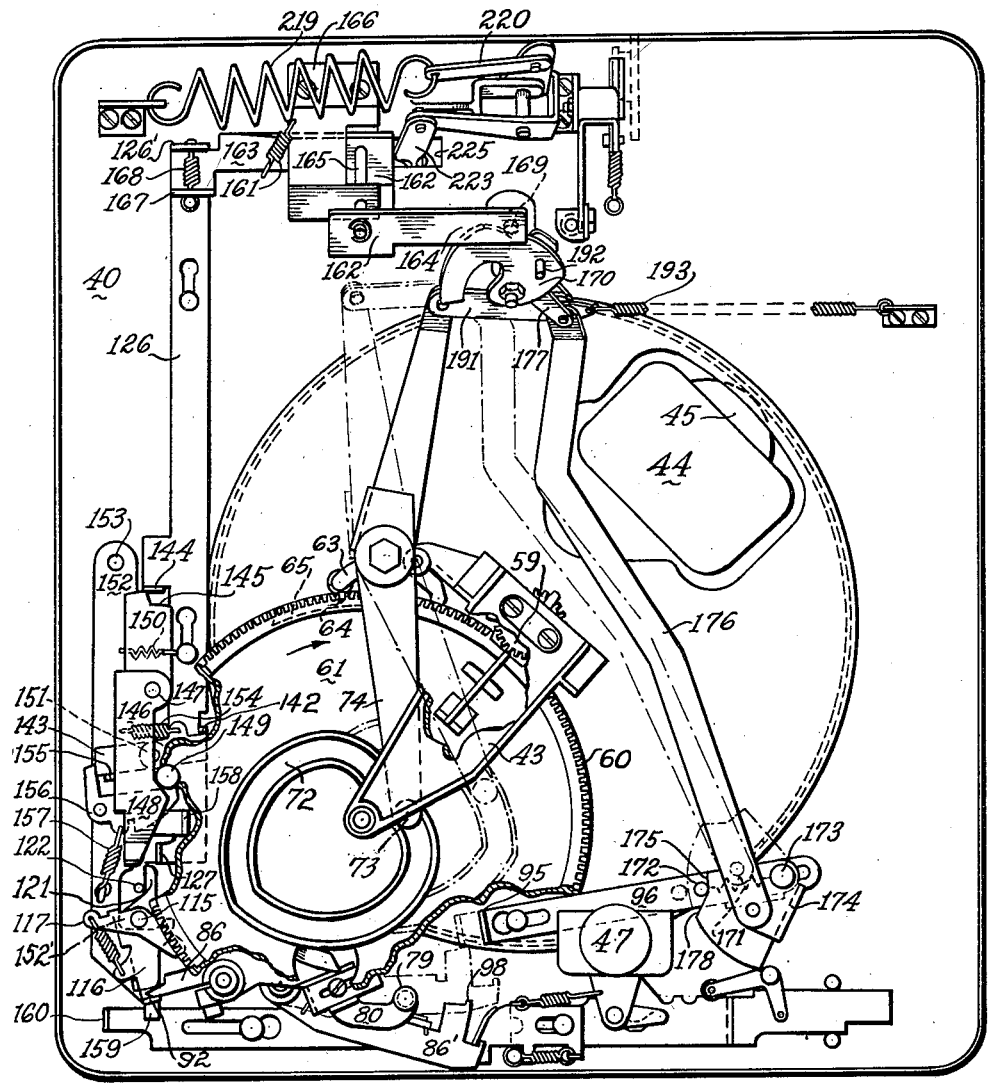
Figure 3 is an inverted plan view showing the mechanism in "manual" position.
Figure 2:
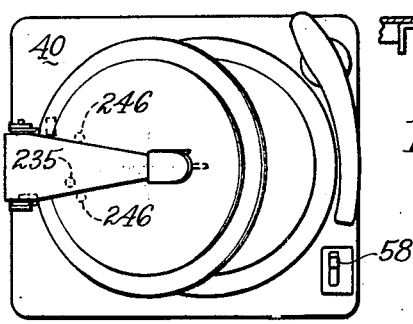
Figure 2 is a plan view thereof on a greatly reduced scale.
Figure 28:
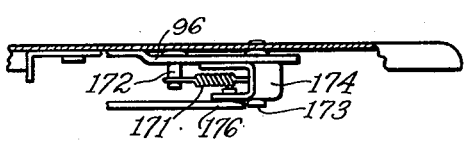
Fig. 28 is a fragmentary elevation of part of the linkage which controls the player arm setting for records of different sizes.

Referring to the drawings, the mechanism is supported by a motor board 40 above which is mounted a turntable 41. The turntable is carried by a spindle 42 which is supported in bearings provided in a bracket 43 mounted on the under side of the motor board 40. The turntable is driven by an electric motor 44 by means of a rubber tired wheel 45 which engages the inner side of the flange 46 of the turntable. The motor 44 is controlled by a switch 47 which is actuated by a pivoted lever 48. The lever 48 carries a pin 49 which extends into a slot 50 in a control bar 51. The control bar 51 is slidably mounted on the under side of the motor board 40 for longitudinal movement. The bar 51 is held in any of three positions by means of a spring pressed dog 52 arranged to cooperate with recesses 53, 54 and 55 and a wedge-shaped projection 56. When the dog 52 engages the recess 54 the pin 49 is in an intermediate offset portion 57 of the slot 50 and the switch 47 is "off." In all other positions of the bar 51 the switch 47 is on and the motor 44 is operating. When the dog 52 is in the recess 53 the machine is set for "manual" operation. In starting the machine for "automatic" operation the bar 51 is moved to its extreme position so that the dog 52 rides up the projection 56, which is the "reject" position and the pressure of the dog 52 displaces the bar 51 so that it engages the recess 55, leaving the machine in "automatic" position. The bar 51 carries a button 58 which projects upwardly through the motor board 40 so that the bar 51 may be manually moved into its various positions. As will hereinafter be pointed out the bar 51 may be automatically moved from its "automatic" position to its "off" position.

The spindle 42 rigidly carries a pinion 59 which meshes with teeth 60 of a cam gear 61. The teeth 60 are interrupted at 62. During the playing of a record the interruption 62 is in alignment with the pinion 59 so that the cam gear 61 is stationary during the playing of a record. The cam gear 61 is held in this position by a spring pressed dog 63 which engages a recess 64 in a cam 65 on the upper side and at the edge of the cam gear 61. Below its teeth the pinion 59 is provided with a number of radial projections 66 which are adapted to cooperate with a dog 67 pivotally mounted on the cam gear 61. The dog 67 comprises a horizontal arm and a vertical arm. A latch 68 pivotally mounted at 69 on the upper side of the cam gear 61 normally latches the dog 67 so that its horizontal arm is above the projections 66. When the latch 68 is moved from its normal position the dog 67 falls by gravity so that its horizontal arm moves into the path of one of the projections 66 and the cam gear 61 is moved thereby so that its teeth 60 mesh with the pinion 59 and the cam gear 61 is given one revolution. During this revolution the vertical arm of the dog 67 engages a formation 70 which recocks the dog 67 into its normal position and the latch 68 moves into latching position by virtue of its spring 71. Consequently when the interruption 62 comes into alignment with the pinion 59 the drive of the cam gear 61 is terminated and the dog 63 enters the recess 64 so as to hold the cam gear 61 in its normal position.

On its under side the cam gear 61 is provided with a heart-shaped cam track 72 which receives a cam follower 73 at one end of a lever 74. The lever 74 is of U-shaped formation at its center to provide two webs whereby it is pivotally mounted on the motor board 40 by means of a post 75. On its upper side the cam gear 61 is provided with a recessed cam formation 76 which provides oppositely directed inclined surfaces. In its normal position a rod 77 is located in the lowest part of the cam recess 76 so that this rod is normally in its lowest position.

On its upper side the cam gear 61 carries an exterior cam 78 which cooperates with a cam follower 79 on an arm 80.

The player arm 81 is mounted by means of a horizontal pivot 82 on a bracket 83 which is rigidly carried by a sleeve 84 through which passes the rod 77. The sleeve 84 is rotatably mounted in a standard 85 carried by the motor board 40. On its lower end the sleeve 84 rigidly carries the arm 80 and an arm 86. The upper end of the rod 77 engages an abutment 87 carried by the player arm 81 outwardly from its pivot 82. It will thus be seen that when the cam gear 61 starts to rotate the rod 77 rides up one of the inclined surfaces of the cam recess 76 so that the player arm is swung upwardly about its pivot elevation the needle off the record. At the end of the rotation of the cam gear 61 the rod 77 rides down the other inclined surface of the cam recess 76 so that the needle is brought down again into engagement with the next record. A counter-poise spring 88 connected to the end of the player arm remote from the needle and to a member 89 carried by the bracket 83 reduces the needle pressure. The member 89 is adjustably mounted on the bracket 83 by means of a slot and screw connection so that the needle pressure may be adjusted by adjusting the location of the member 89 on the bracket 83.

An arm 86' is pivotally mounted on the motor board 40, being located above the arm 80 and below the control bar 51. The arm 86' is biased inwardly by a spring 90 which is also connected to the upper web 91a of a frame 91 so that it tends to move the down-turned detent 92 carried by this upper web 91a towards the arm 86. The arm 86' is provided with two faces 93 and 94 which are adapted to engage a flange 95 turned down from a bar 96. The arm 86' carries the player arm into initial playing position. When the face 93 engages the flange 95 the player arm is moved into initial playing position for a ten inch record and when the face 94 engages the flange 95 the player arm is moved into initial playing position for a twelve inch record. At the outer ends of the faces 93 and 94 the arm 86' is provided with detents 97 and 98. These detents prevent disengagement of the arm 86' by the flange 95 or by a flange 99 when the arm 86' is free to move inwardly, thereby preventing injury to a record by the needle. The arm 80 carries an upwardly projecting abutment 100 in alignment with a downturned lug 101 on the arm 86'. A weak spring 102 carried by the arm 86' projects slightly through the lug 101. When the arm 80 is swung outwardly by the cam 78 the projection 100 engages the spring 102, compressing it, and the engagement between the abutment 100 and the lug 101 carries the arm 86' outwardly. When the cam follower 79 rolls down the fall 103 the arm 86' is moved inwardly by the spring 90, carrying the arm 80 and the player arm inwardly. During this inward movement the roller 79 engages a lever 104 pivotally mounted on the cam gear 61 and projecting through the fall 103 of the cam 78. The lever 104 is biased towards the roller 79 by a relatively weak spring 105 so that the spring 102 is held compressed until the roller 79 clears the lever 104. This occurs after the face 93 or the face 94 of the arm 86' engages the flange 95 so that the player arm is located for the initial playing of a record of one size. Before the roller 79 clears the lever 104 the player arm is lowered by the rod 77 moving downwardly to the lowest part of the cam formation 76. Consequently when the roller 79 clears the lever 104 the needle is in contact with the record to be played and the spring 102 applies a gentle push to the player arm to carry the needle into the recording groove.

At its end remote from its detent which engages the dog 67 the latch 68 carries a spring pressed dog 106 which is arranged to be engaged by a serrated edge 107 carried by the arm 80 as the player arm moves inwardly on the record. When the needle runs into an eccentric groove at the end of the recoring groove the arm 80 is given a reverse movement which carries the latch 68 into unlatching position so that the mechanism is tripped and the cam gear 61 is given one revolution. The formation 70 is carried on the under side of the arm 80. An abutment member 108 adjustably mounted on the under side of the arm 80 is arranged to engage a down-turned flange 109 on the latch 68 when the needle is carried inwardly by a spiral groove at the inner end of the recording groove of a record so that the latch 68 is actuated to initiate a single revolution of the cam gear 61. It is to be noted that the player arm is moved outwardly by a rise 110 on the cam 78. In the normal position of the cam gear 61 cam roller 79 is free to move inwardly between the cam fall 103 and the cam rise 110 as the player arm moves inwardly during the playing of the record.

A bar 111 is slidably mounted on the under side of the motor board 40 and carries depending flanges 112 and 113. The bar 111 is connected 114 may be provided with down-turned lugs to the bar 51 by means of a link 114. The link which enter holes in the bars 111 and 51. When the bar 51 is moved to "manual" position the flange 113 is brought into engagement with the vertical arm of the dog 67 in its normal position so that this dog is held against dropping downwardly into the path of the projections 66 on the pinion 59. When the bar 51 is moved in the opposite direction into the "reject" position its flange 112 engages the pin which mounts the dog 106 on the latch 68 so that the latch is moved to unlatched position, putting the cam gear 61 into operation. When the bar 51 is allowed to return to "automatic" position the flange 112 moves out of the path of the pivot pin.

The frame 91 is of U-shaped section comprising the upper web 91a, a lower web 91b and a connecting web 91c. The frame 91 is pivotally mounted on a pin 115 which depends from the motor board 40. A frame 116, embracing the frame 91, is likewise mounted on the pin 115 and on the lower end of the pin 115 is pivotally mounted a dog 117 which is adapted to be displaced in clockwise direction as viewed from below by the cam 65 at an intermediate position of the cam gear 61. The dog 117 is connected to the lower web of the frame 116 by a spring 118 so that the frame 116 tends to move in the same direction. The dog 117 is provided with an up-turned flange 119 which normally engages the frame 116. The lower web 91b of the frame 91 carries a down-turned lug 120 which engages the lower web of the frame 116 so that the detent 92 is caused to follow the frame 116 when the latter is moved, in clockwise direction, as viewed from below, by the dog 117. The upper web of the frame 116 includes a tail 121 which normally abuts against a stop 122 under the influence of the spring 90 connected to the frame 91, and the connection between the two frames provided by the lug 120.

The detent 92 cooperates with the inclined surfaces 123 and 124 and the radial surface 125 of the arm 81. When the player arm is moved outwardly the surface 123 cams the detent 92 outwardly so that it engages this inclined surface 124 or the radial surface 125. When the detent 92 engages the radial surface 125 the player arm is locked outwardly in its extreme position and it cannot move inwardly until the detent is unlocked. When the detent 92 engages the sloping surface 124, the player arm is merely latched in its outward position and it can be moved inwardly by hand, the detent 92 and the sloping surface 124 cooperating as a latch and not as a lock.

In a normal record changing cycle the dog 117 is swung in clockwise direction as viewed from below and its spring 118 carries the frame 116 with it and this frame carries the frame 91 with it so that the player arm is unlocked. This occurs when the roller 79 is about to follow the fall 103 of the cam 78 and the displaced condition of the detent 92 is maintained by the cam 65 until the arm 81 has cleared the normal position of the detent. As will hereinafter be explained a bar 126 is displaced during the record changing cycle which occurs automatically after the last record has been played bringing a projection 127 into the path of the tail 121 on the frame 116 before the dog 118 is actuated by the cam 65. Consequently the dog 117 is not able in this case to displace the frame 116 so that the detent 92 maintains its locking relation with the arm 81 and the player arm remains locked out. As will also be explained hereinafter the displacement of the bar 126 results in the opening of the switch 47 so that the operation of the phonograph automatically terminates with the player arm locked out.

When the control bar 51 is moved to manual playing position, displacing the bar 111 so as to lock up the dog 67 a lug 128 turned down from the end of the bar 111 engages the frame 91 and displaces it slightly so that the detent 92 cooperates with the sloping surfaces 124 and 123. Consequently in "manual" operation the detent 92 serves merely as a latch for the player arm and the player arm may be manipulated by hand. Upon the bar 51 are mounted an upper slider 129 and a lower slider 130. The upper slider is mounted on the bar 51 by means of a stud 131 which extends through a slot 132 in the bar 51 and by means of two lugs 133 and 134 which are turned downwardly so as to embrace the bar 51. A strong spring 135 connected to the lug 134 biases the frame 129 away from the arm 86'. The lower slider 130 is provided with a slot 136 which receives the stud 131 and it also carries a stud 137 which extends through the slot 132. The slider 130 is biased towards the arm 86' by means of a spring 138 which is connected to the slider 130 and to a pin 139 on the motor board 40. The pin 139 is adapted to engage projections 140 and 141 on the slider 130 so as to limit its movements. In the "reject," "automatic" and "off" positions of the bar 51 the spring 135 holds the stud 131 against the end of the slot 136 remote from the arm 86' and the stud 131 by its engagement with the slot 136 holds the abutment 140 of the lower slider 130 against the pin 139, the weak spring 138 being tensioned. When the bar 51 is moved to "manual" position the end of the slot 132 moves the stud 131 and its slider 129 toward the arm 86' and the slider 130 tends to follow the stud 131 towards the arm 86' so that the flange 99, which is turned down from the slider 130, is biased into position in alignment with the face 93 of the arm 86'. If the movement of the bar 51 is effected when the arm 86' has an inward position the arm 86' may be locked out by merely moving the player arm outwardly to its extreme position. The flange 99 is cam-shaped so that the arm 86' may move past it outwardly, the slider 130 being merely moved away from the arm 86' against the tension of the spring 138. When the arm 86' attains its outward position the spring 138 moves the slider 130 towards the arm 86' so that the flange 99 may be engaged by the face 93 of the arm. It is to be noted that the projection 97 prevents withdrawal of the flange 99 from the surface 93. If the bar 51 is moved to "automatic" position the face 93 remains engaged by the flange 99 until the arm 86' is moved further outwardly by a record changing cycle. When the arm 86' is thus moved further outwardly by the arm 80 and the cam 78 the slider 130 is moved into its normal position by the spring 135 acting on the frame 129 and the engagement between the two frames provided by the lug 133 and the lug 141 on the lower frame 130.

Figure 4:
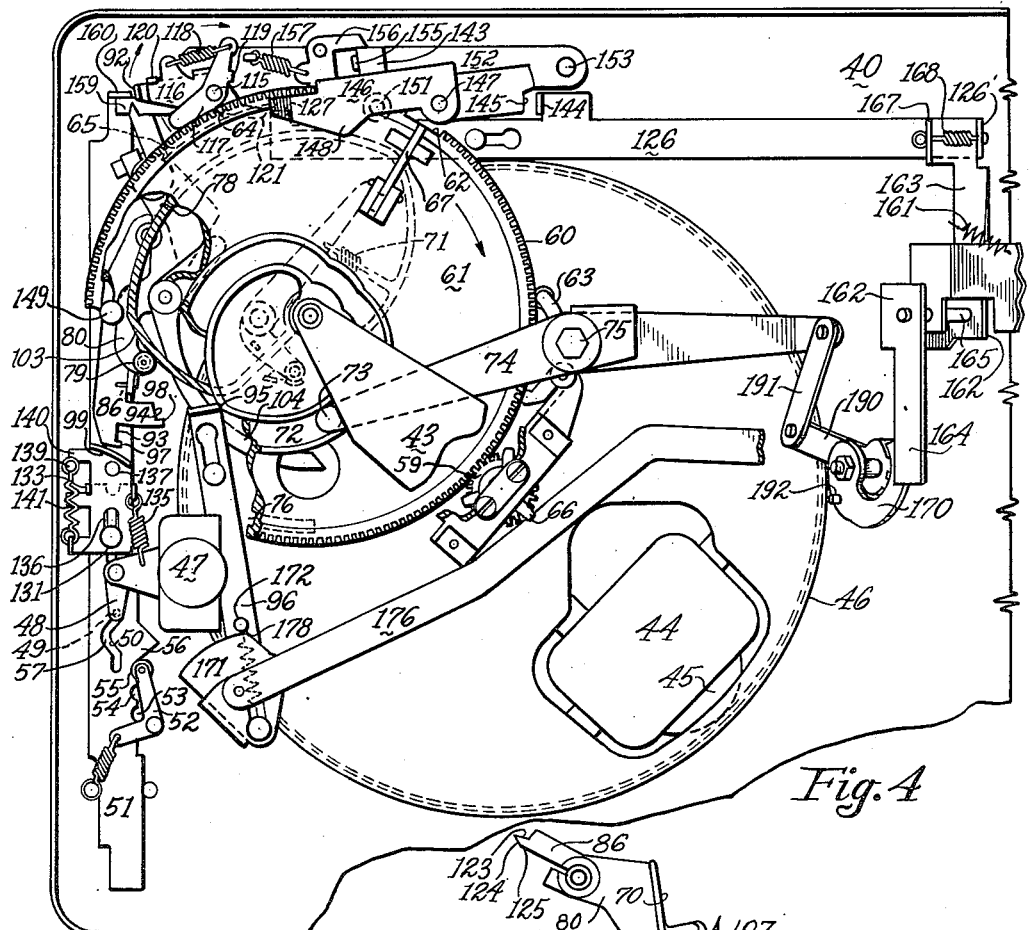
Figure 4 is a view similar to Figure 3 showing the mechanism at an intermediate position in the record changing operation.
Figures 22, 23:
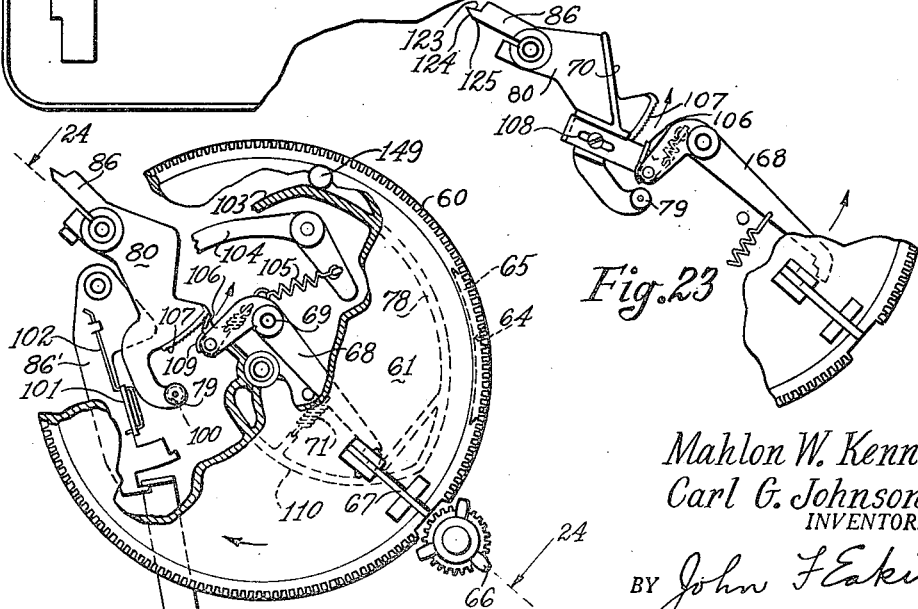
Fig. 22 is an inverted plan view of the main cam gear partly broken away to show the trip mechanism.
Fig. 23 is a similar view of the trip mechanism showing the manner in which the trip acts after the playing of a record with a run-in spiral groove.

The bar 126 is slidably mounted on the underside of the motor board by means of studs and slots. In addition to the projection 127 which engages the tail of the dog 116 it is provided with a down-turned projection 142 which is adapted to engage a latch 143 and a down-turned stop 144 which is adapted to engage a surface 145 on a pivoted member 146 to limit the displacement of the bar from normal position. The member 146 consists of a U-shaped frame which is pivotally mounted on the motor board 40 by means of a pivot pin 147. The lower web of the frame 146 comprises a cam formation 148 which is adapted to cooperate with a pin 149 carried on the lower side of the cam gear 61. In the normal position of the cam gear, as shown in Fig. 3, the pin 149 engages a lower point on the cam formation 148 so that the frame 146 is held in a somewhat outward position relative to the cam gear 61. When the cam gear begins to rotate the pin 149 is carried away from the frame 146 so that the frame 146 is free to move inwardly under the influence of its spring 150 into the somewhat inner position shown in Figure 4, which position is defined by the engagement of the upper web of the frame 146 with the pivot of the latch 143 which is indicated at 151, this latch being pivotally mounted on the motor board 40. The spring 150 is connected to the tail of the frame 146 and to a lever 152 which is pivotally mounted at 153 on the motor board 40. The lever 152 is biased inwardly by the spring 150 and by a spring 154 which is connected to the latch 143 and to the lever 152. The tension of the spring 154 causes the latch 143 to bear normally against a stop 155 on the lever 152. A dog 156 pivotally mounted on the lever 152 is biased by a spring 157 so that the dog tends to be moved into alignment with a down-turned flange 158 carried by the upper web of the frame 146. The tail of the dog 156 normally engages the outer end of the latch 143 which prevents the dog from moving into alignment with the flange 158. During a normal record changing cycle the bar 126 is not displaced from its normal position and consequently the latch 143 maintains the dog 156 in its position of Fig. 4. When the pin 149 engages the cam formation 148 and moves the frame 146 outwardly the flange 158 engages the arcuate side of the dog 156 so that this dog is rotated in counterclockwise direction as viewed from below and the lever 152 is not actuated.

During the record changing cycle which automatically takes place after the last record has been played the bar 126 is displaced to the left when the pin 149 is clear of the frame 146 so that the latch 143 is unlatched by the projection 142 and the dog 156 swings in clockwise direction as viewed from below, its tail engaging the stop 155. This swinging movement brings the dog 156 into normal relation to the flange 158. This displacement of the bar 126 locks the tail of the frame 116 against displacement before the dog 117 is engaged by the cam 65. Consequently the player arm remains locked out. After the cam 65 has cleared the dog 117 the bar 126 returns to its normal position, leaving the player arm locked out and the dog 156 normal to the flange 158 of the frame 146. In the last few degrees of rotation of the cam gear 61 the pin 149 rides over the cam formation 148 of the frame 146, displacing the frame outwardly in usual manner. In this case however the flange 158 of the frame 146 engages the dog 156 and thus the lever 152 is displaced outwardly. The end 159 of the lever 152 engages a down-turned projection 160 on the bar 51 and displaces the bar 51 from "automatic" position into "off" position so that the switch 47 is opened. The inertia of the elements carries the cam gear 61 to its normal position shown in Fig. 3, the cam gear being retained in this position by engagement of the spring pressed dog 63 with the recess 64.

It is to be noted that when the latch 143 is unlatched by the projection 142, the tail of the dog 156 moves into engagement with the stop 155. When the bar 126 returns to normal position the latch 143 engages the end of the tail of the dog 156. When the lever 152 is forced outwardly the tail of the dog 156 clears the latch 143 so that the latch may also engage the stop 155. When the pin 149 moves past the cam formation 148 into its position in Fig. 3 the lever 152 moves inwardly so that the tail of the dog 156 is engaged by the end of the latch 143 and the dog is thereby swung into its normal position out of alignment with the flange 158. Suitable stop means limit the inward movement of the lever 152 under the influence of the springs 150 and 154. In the embodiment illustrated, the point 152' (Fig. 3) of the lever 152 is arranged to engage the pin 115 for this purpose.

The bar 126 is slidably mounted on the underside of the motor board 40 and is biased into its normal position by a spring 161 which is attached to a frame 162. The frame 162 is of U-shaped formation providing an upper arm 163 and a lower arm 164. The frame 162 is pivoted on a sloping axis by a pin 165 which is supported by a bracket 166 mounted on the under side of the motor board 40. The bracket 166 provides an abutment for the arm 163. This arm engages a down-turned flange 126' at the end of the bar 126. The flange 126' is connected to a flange 167 on the arm 163 by means of a spring 168. The arm 164 carries a cam follower 169 which is adapted to be engaged by a cam 170 also mounted on an oblique axis. It will be seen from Fig. 3, that when the cam 170 is in its lower full line position shown in Fig. 14 and is rotated in the clockwise direction as viewed from below the frame 162 is swung in counterclockwise direction, tensioning the spring 161, displacing the bar 126 by virtue of the connection between the arm 163 and the bar 126 provided by the spring 168. When the cam 170 returns to its normal position the spring 161 returns the frame 162 and the bar 126 to normal positions.

The bar 96, which is slidably mounted on the under side of the motor board, is biased towards its ten inch position by means of a spring 171 which extends from a pin 172 on the bar 69 to a pivot pin 173 carried by the motor board. The pin 173 serves as a pivot for a U-shaped frame 174. The upper web of the frame 174 provides a cam which cooperates with the pin 172. In normal condition the pin 172 bears against a low rest 175 on the cam which locates the flange 95 in the ten inch position in alignment with the surface 93 on the arm 86' as shown in full lines in Fig. 3. The lower web of the frame 174 is pivotally connected to a link 176 which is normally in the position shown in full lines in Fig. 3. The link 176 is pivotally connected to an arm 177. As will be more readily understood from later description, the arm 177 is displaced substantially when a twelve inch record is about to be dropped on to the turntable 41 so that the link 176 moves into the dot and dash position in Fig. 3. In moving to this dot and dash position the link 176 carries the frame 174 into its dot and dash position in Fig. 3 so that the rise 178 of the cam displaces the pin 172 and the bar 96 into twelve inch position so that the flange 95 is brought into position for engagement with the surface 94 and the player arm is located at initial playing position for a twelve inch record. It is to be noted that the detent 98 prevents disengagement between the flange 95 and the surface 94 when the frame 174 returns to normal position. The bar 96 returns to its normal position under the influence of the spring 171 after the arm 86 is moved outwardly by the outward movement of the player arm after the twelve inch record has been reproduced.

A standard 179 mounted on the motor board 40 carries a sleeve 180 at an oblique angle through the motor board. The sleeve 180 rotatably receives a sleeve 181 which rotatably supports a sleeve 182. At its upper end the sleeve 182 carries a housing 183 and a table 184. The table 184 is at right angles to the sleeve 182 so that it rotates in a plane. The sleeve 182 slidably receives a rod 185 which rigidly carries the cam 170. A lever 186 pivotally mounted on the under side of the table 184 at 187 carries at its outer end a contact member 188 which normally projects upwardly through an opening in the table 184. The other end of the lever 186 extends below the head 189 of the rod 185. In normal condition the contact 188 is projected above the surface of the table 184 by the weight of the rod 185 and the cam 170 and the cam 170 is in alignment with the cam follower 169. When a record of either size is supported above the turntable for discharge onto the turntable the contact 188 is depressed and the cam 170 is elevated above the cam follower 169 so that the bar 126 is not actuated by actuation of the cam 170 when a record is being discharged and it is actuated when no record is being supported by the table 184. At its lower end the sleeve 182 rigidly carries the arm 177 and at its lower end the sleeve 181 rigidly carries an arm 190 which is connected by a link 191 to the end of the lever 74 remote from its cam follower 73. Consequently the sleeve 181 is given a complete oscillation during each revolution of the cam gear 61. A downwardly projecting pin 192 carried by the boss of the arm 190 projects through an opening in the cam 170 so that the cam 170 is oscillated in unison with the sleeve 181. A spring 193 connected to the arm 177 and to the motor board biases the table 184 into its normal position which is defined by the engagement of a housing 195 carried by the table and an abutment 196 mounted on the standard 179.

At its upper end the sleeve 181 rigidly carries a radial arm 197 which is adapted to engage a pin 198 depending from the table 184 in the last part of the first half of the oscillation of the sleeve 181. Consequently the table 184 is displaced through a relatively small angle which is, however, sufficient to carry an abutment 199 into engagement with a ten inch record resting on the table 184 so that this record is displaced radially with respect to the table and sufficiently to cause its discharge as will hereinafter be explained. If a twelve inch record is resting on the table 184 the abutment 199 is depressed. The abutment 199 projects upwardly from a frame 200 pivotally mounted on the under side of the table 184, the abutment 199 being biased upwardly normally through a hole 201 in the table 184 by a spring 200' which engages the underside of the frame 200. The frame 200 comprises a downwardly extending hook member 202 which is normally above and ahead of the arm 197. When a twelve inch record is resting on the table 184 it depresses the abutment 199 and its frame 200 so that the hook member 202 is moved downwardly into the path of the arm 197. In this case the table 184 is given a much greater displacement so that the periphery of the twelve inch record is engaged by the upper end of a plunger 203 which is slidably mounted in the housing 195 carried by the table 184, displacing a twelve inch record outwardly so that it is discharged onto the table in manner which will be hereinafter more fully described.

In addition to their support on the table 184 the records are supported by a post 204 which extends through their central openings. This post is so located that ten inch records have a very slight support on the table 184. Twelve inch records overlap the table 184 to a substantial degree and the discharge of a twelve inch record is accompanied by a simultaneous movement of the twelve inch record over the surface of the table. We provide means for elevating the discharging twelve inch record above the table 184 and in the event that another twelve inch record is immediately above the discharging record we elevate that record also. We provide on the upper side of the table 184 a segment of sheet stock 205. The member 205 is provided with an opening 206 through which the plunger 203 extends. Forwardly of the plunger 203 the member 205 is provided with an inclined surface 207 which tapers gradually down to the level of the table 184. As shown in Fig. 7 a twelve inch record rests on the table 184 clear of the member 205, depressing the contacts 188 and 199. Depression of the contact 188 raises the cam 170 and depression of the contact 199 brings the hook member 202 into the path of the arm 197. Consequently when the arm 197 starts to oscillate it engages the hook member 202 and carries the table 184 with it through a substantial displacement. This displacement brings the wedge-shaped portion 207 of the member 205 underneath the lowermost record so that all the records are elevated and the periphery of the lowermost twelve inch record is engaged by the stud 208 which forms the upper part of the plunger 203. Below the stud 208 the plunger 203 comprises a shoulder 209. The stud 208 is somewhat deeper than the thickness of a twelve inch record but normally it projects above the surface of the member 205 a distance slightly less than the thickness of a twelve inch record. Consequently when the stud 208 engages a lowermost twelve inch record the stud 203 displaces the lowermost twelve inch record and passes under another twelve inch record immediately above the lowermost twelve inch record. After the stud 208 has moved under the second twelve inch record and before the lowermost twelve inch record has been discharged the lower end of the plunger 203 rides up an inclined surface 210 and the second twelve inch record is elevated and the lowermost twelve inch record is also elevated as shown in Fig. 13. Since the stud 208 is deeper than the thickness of a twelve inch record the elevational movement separates the two lowermost twelve inch records and the portion of the lowermost record overhanging the table 184 is now located in a substantial space provided between the second twelve inch record and the table 184. This free space facilitates the discharge of the lowermost record, which is accompanied by a bodily movement of the lowermost record to the right as viewed in Fig. 13. It is to be noted that in the event that a lowermost ten inch record has immediately above it a twelve inch record the plunger 203 does not engage the second record because the discharging movement of the table 184 for a ten inch record is effected by the engagement of the arm 197 with the pin 198 and the smaller arcuate movement applied to the table 184 is insufficient to carry the plunger 203 into engagement with the second record. The surface 210 is provided on a stationary ring member which may be integral with the standard 179.

It is to be noted that the lesser movement applied to the table 184 when a ten inch record is being discharged results in a similar smaller movement of the arm 177 and the link 176 so that the bar 96 is not moved out of its normal ten inch position.

The post 204 which supports the records adjacent their center openings depends from a magazine element which is a frame 211. The frame 211 is pivotally mounted on a bracket 212 by means of a pivot pin 213. The bracket 212 is mounted on the other side of the table 184 from the turntable 41 and the frame 211 normally extends over the table 184 and part of the turntable, the frame 211 normally extending in radial direction with respect to the turntable and preferably in inclined position as shown in Fig. 1. The post 204 has a main portion 214 which extends downwardly from the frame 211 and obliquely away from the table 184. This main portion 214 gives into a terminal portion 215 which is curved downwardly so that its lower end is normally in alignment with the turntable spindle 42. The end of the portion 215 approaches the upper end of the spindle 42 and is preferably provided with a projecting pin 216 which extends into an opening in the upper end of the spindle 42. The oblique portion 214 of the post 204 is provided with a step 217 on its side remote from the table 184. On its other side the post 204 carriers a detent 218 which is spaced above step 217 by approximately the thickness of a twelve inch record. The thickness of the post and detent 218 in the location of the second record from the bottom holds this second record in alignment with the step 217 so that when the lowermost record is discharged onto the turntable the second record merely drops down the thickness of one record and it rests upon the step 217, clearing the detent 218. Consequently the lowermost record is free for movement by the mechanism on the table 184 upwardly and outwardly so that it clears the step 217. The record is now free to slide down the inclined portion 214 of the post 204, since this portion is inclined downwardly and away from the table 184 so that the record drops down the post 204 onto the turntable 41. In the case of a ten inch record being discharged, a very slight movement of the record clears its edge from the table 184. In the case of a twelve inch record being discharged the large space provided between the table 184 and the discharging record at the moment of discharge, as shown in Fig. 13, permits the discharging record to move easily away from the table 184 as its center opening slides down the post 204 and onto the spindle 42.

The frame 211 is biased upwardly by a strong spring 219 which is connected to the motor board 40 and to a link 220. The link 220 is connected to one arm of a bell crank lever 221, the other arm of which is connected to a vertically extending link 223. The bell crank lever 221 is pivotally mounted on a bracket 224 mounted on the under side of the motor board 40. The link 223 extends through an opening 225 in the motor board, its upper end being connected to an arm 226 rigidly carried by the frame 211 and extending inwardly, that is, in the same general direction as the normal position of the frame 211. A latch is provided to hold the frame 211 in normal operating position against the tension of the spring 219. The latch is in the form of a spring pressed dog 227 which normally engages a ratchet 228 rigidly carried on a bracket 229 mounted on the motor board within the bracket 212. The dog 227 may be moved out of engagement with the ratchet 228 by means of a manually operated lever 230 which is pivotally mounted on the frame 211 below an extension 231 of the frame which serves as a handle for manipulating it, the arrangement being such that a normal grasp of the handle 231 actuates the bell crank lever 230. A rod 232 connected to the bell crank lever 230 and to the dog 227 communicates movement from the bell crank lever 230 to the dog 227. Thus, to raise the frame 211 the handle 231 is grasped by the hand, the bell crank lever 230 is actuated by the fingers and the frame 211 is allowed to move upwardly into substantial vertical position, as indicated in dot and dash lines in Fig. 17 by action of the spring 219. If the frame 211 is manually disengaged the dog 227 engages the ratchet 228 and consequently the frame cannot snap into its vertical position.

When the frame 211 is in its substantial vertical position the outer end 215 of the post 204 is located substantially above the turntable 41 and is directed only slightly downwardly. Consequently a plurality of records may be readily applied to the post 204. The main portion 214 of the post 204 slopes downwardly so that the records tend to move automatically towards the frame 211. When a record moves past the step 217 it automatically drops so that it can continue its movement past the detent 218. In this way any desired number of records may be applied to the post 204.

A weight 233 is pivotally mounted at 234 on the under side of the frame 211. This weight is arranged so that it applies pressure to the portion of the records which are supported on the table 184. When the frame 211 is in its vertical loading position the weight 233 lies adjacent the frame. As the frame 211 is moved downwardly to its normal position, which is effected by manual pressure applied to the handle 231, aided by the weight of the records, the weight 233 tends to swing the records towards vertical position. This is prevented by means of a projected rod 235 which is temporarily projected upwardly in front of the descending records so that the records are swung towards horizontal position and above the table 84. The rod 235 is slidably supported in a tubular guide 236 mounted on the motor board adjacent and slightly to one side of the table 184. The lower end of the rod 235 is connected by a short link 237 to a lever 238 pivotally supported by a bracket 239 which depends from the motor board 40. The opposite end of the lever 238 is connected by a link 240 to the lower end of a lever 241 which extends through an opening in the motor board 40 and is pivotally mounted at 242 on the bracket 212. The upper end of the lever carries a cam follower 243 which cooperates with a cam 244 carried by the frame 211 near its pivot. When the frame 211 is in its vertical position the cam follower 243 is located within a recess 245. A very slight movement of the frame 211 moves the cam follower 243 to the highest point on the cam 244 and the rod 235 is projected upwardly almost immediately to its full extent as shown in dot and dash lines in Fig. 18. The lower edges of the records are thus engaged between the upper end of the rod 235 and the weight 233 and they are thus held until the records are swung towards the horizontal and over the table 184. As the frame 211 is moved towards its normal position the rod 235 is gradually retracted until its upper end is located slightly below the plane of the table 184. Two stationary pins 246 are preferably mounted on the motor board and project upwardly on either side of the table 184, their upper ends being slightly below the plane of the table. These pins are intended to prevent the records resting upon the table from being tilted to one side or the other.

While operation of the phonograph will be readily understood from the foregoing description thereof, a brief summary of the general operation is now given. The phonograph is automatically stopped with several records which have been played, on the turntable 41. The bar 51 is in "off" position, the switch 47 is open and the player arm 81 is locked out clear of the records on the turntable. The handle 231 of the frame 211 is grasped, actuating the lever 230 and disconnecting the dog 227 from the ratchet 228 and the frame 211 is permitted to move into its substantially vertical position under the influence of the spring 219. During this movement the rod 235 moves upwardly and then drops down to its lowermost position. The played records can now be removed from the turntable 41 and a stack of records which is desired to be played are applied upon the post 204. These records may be intermixed and they may be applied singly, or their center openings may be aligned and passed over the curved portion 215 of the post 204. If the records are allowed to slide down the main portion 214 of the post 204 they easily pass the step 217 and the detent 218. The frame 211 is now moved downwardly against the tension of the spring 219. The rod 235 immediately projects upwardly to its fullest extent so that it becomes interposed between the lower edges of the records and the turntable. The weight 233 moves the records towards the upper end of the rod 235. As the frame 211 is moved towards its normal position the rod 235 moves downwardly, keeping the records substantially parallel to the frame 211 until they are located above the table 184, whereupon the rod 235 is retracted out of contact with the lowermost record, leaving the stack of records supported exclusively by the table 184 and the step 217. It is to be noted that as the frame 211 moves downwardly the major portion 214 of the post 204 is brought into downwardly sloping position so that the records tend to slide down thereon towards the turntable. The lowermost record is guided by the detent 218 so that the lowermost record seats on the step 217. The detent 218 holds the second record against displacement. The motor is now started by moving the control button 58 to "reject" position, which actuates the bar 51 to operate the trip by displacement of the bar 111. On release of the button 58 the bar 51 automatically moves to "automatic" position, leaving the cam gear 61 in operation to make one complete revolution. The cam 72 oscillates the arm 197 and cam 170. Since the contact 188 is engaged by a record on the table 184 the cam 170 is above the cam follower 169 and promptly rides above it so that the bar 126 is not actuated. In the event that the lowermost record is a twelve inch record the arm 197 promptly engages the hook 202 which is in its lowermost position owing to engagement of the lowermost twelve inch record with the contact 199. Consequently the table 184 and its sleeve 182 are subjected to a substantial displacement so that the bar 96 is displaced by the cam rise 178 from its normal ten inch position into its normal twelve inch position, which position is maintained until the flange 95 is engaged by the surface 94 of the arm 86'. The displacement of the table 184 brings the inclined surface 207 gradually beneath the lowest twelve inch record elevating all the records. Thereupon the stud 208 engages the periphery of the lowermost record and moves it upwardly slightly until the stud 208 is located below the next highest record, if that is also a twelve inch record. Continued displacement of the table brings the plunger into engagement with the cam surface 210 which displaces the plunger upwardly, raising the second record and then raising the lowermost record as shown in Fig. 13. Thereupon the continuing displacement of the lowermost record by the stud 208 moves the lowermost record off the step 217 so that the central portion of the record slides down the inclined portion 214 of the post 204 withdrawing the lower portion of the record out of the open space in which it is located, this open space providing for the angular movement of the lowermost record as it is withdrawn from the table 184. The record is dropped when the cam gear 61 has made approximately half a revolution and thereafter the cam 65 swings the dog 117 and the frames 116 and 91 in clockwise direction as viewed from below, unlocking the player arm and permitting the arm 89 to be forced inwardly by the spring 99 acting on the arm 86', the cam follower 79 moving down the cam fall 103 until the surface 94 on the arm 86' engages the flange 95 which is still in the twelve inch position. The player arm is thus located in the initial twelve inch position and the needle moves down into engagement with the record by movement of the cam formation 76 beneath the pin 77. When the cam follower clears the spring pressed lever 104 it receives a slight inward impulse from the very light spring 102 so that the needle enters the recording groove. The cam gear 61 terminates its revolution when the interruption 62 registers with the gear 59 and the cam gear remains immovable until the player arm trips the latch 68 at the end of the reproduction of the record. The resulting record changing cycle is precisely similar to that previously described except in this case the player arm is in. The needle is promptly elevated from the record by the cam groove 76 and the pin 77 and thereafter the player arm is thrown out to its extreme position in which it is locked by the detent 92. The outward movement of the arm 89 carries the arm 86' outwardly also so that the bar 96 is freed to move to its normal ten inch position.

If the record now in the lowermost position is a ten inch record the bar 126 is not actuated because the engagement of this record with the contact 188 holds the cam 170 elevated above the cam follower 169. The record does not however engage the contact 199, so that the hook 202 is not engaged by the arm 197, and it is only when the arm 197 moves through a considerable arc into engagement with the depending pin 198 that the table 184 is moved slightly bringing the upwardly projecting contact 199 into engagement with the periphery of the ten inch record and displacing the ten inch record radially so that it clears the step 117. The central part of the record moves downwardly at a time when very little of the lowermost record is resting upon the table 184 and the downward movement of the record draws the record clear of the table and down to the turntable. Owing to the small arcuate displacement of the table 184 in this case the bar 96 remains in ten inch position so that it engages the surface 93 of the arm 86' when that arm moves inwardly, the player arm being unlocked by the cam 65 in the manner previously described. The records on the post 104 are thus played one after the other until the last record has been played. When the last record has been played the cam gear 61 is put into operation to complete a final revolution, but in this case the cam 170 engages the cam follower 169 so that the bar 126 is displaced, locking the frame 116 and unlatching the latch 143. During each of the previous record changing cycles the pin 149 on the cam gear 61 has actuated the frame 146 but since the dog 156 was latched out by the latch 143 the lever 152 was not displaced. When however the bar 126 was actuated the latch 143 was moved to unlatched position and near the end of the final revolution of the cam gear 61 the pin 49 moves the frame 146 outwardly and its flange 158 engages the unlatched dog 156 so that the lever 152 is actuated and its end 159 moves the control bar 51 to its "off" position by virtue of its engagement with the flange 160. As has been noted above the frame 116 remains locked by the projection 127 of the bar 126 while the cam 65 is actuating the dog 117, so that the player arm remains locked out after the operation is automatically terminated.

To adapt the machine for "manual" operation the frame 211 is moved into its vertical position and the bar 51 is moved to its "manual" position displacing the bar 111 so that its flange 113 locks the dog 67 against release. The displacement of the bar 111 moves the frame 91 outwardly slightly so that its detent 92 cooperates with the inclined surfaces 123 and 124 in the manner of a latch which can be overcome by slight manual force. The displacement of the bar 51 results in the biassing of the flange 99 into the position of the surface 93 of the arm 86'. This arm may consequently be locked out by manually moving the player arm out to its extreme outward position. The player arm is now free for manual adjustment and is free to follow the needle as it moves across the record during playing. After desired manual operation the machine may be stopped by moving button 58 and the bar 51 to "off" position. The machine is in condition for the resumption of "automatic" playing, the arm 86' being automatically released from the flange 99 by the first rotation of the cam gear 61, allowing the flange 99 to be withdrawn out of the path of the arm 86'.

Although the invention has been described in connection with the specific details of a preferred embodiment thereof, it must be understood that such details are not intended to be limitative of the invention except in so far as set forth in the following claims.

We claim:

1. In an automatic phonograph, in combination, a turntable having a centrally located spindle, a swinging magazine element pivotally mounted on a generally horizontal axis adjacent said turntable and arranged to occupy a position above said turntable, a post carried by said element and extending downwardly into alignment with the turntable spindle, a record supporting step on said post, said magazine element being arranged to be swung upwardly about its axis to elevate the post away from the spindle so that a stack of records may be applied to said post to rest on said step with the post extending through their central openings, a lateral support located adjacent the turntable to provide marginal support for records supported on said step, a locking element arranged to lock the magazine element in any of a large number of intermediate positions, means biassing said locking elements towards locking position, a member mounted on said magazine element operatively connected to said locking element and arranged for manual actuation to unlock said locking element, a projectable member located between the turntable and said lateral support and arranged to be projected upwardly therebetween, and operating elements cooperating with the magazine element to project said projectable member upwardly beyond said lateral support when the magazine element is in intermediate positions and retract it downwardly below said lateral support in the extreme positions of the magazine element, said projectable member being located, in its upward position, to swing the records over the lateral support when the magazine is moved downwardly towards operating position.

2. In an automatic phonograph, in combination, a turntable having a centrally located spindle, a swinging magazine element pivotally mounted on a generally horizontal axis adjacent said turntable and arranged to occupy a position above said turntable, a post carried by said element and extending downwardly into alignment with the turntable spindle, a record supporting step on said post, said magazine element being arranged to be swung upwardly about its axis to elevate the post away from the spindle so that a stack of records may be applied to said post to rest on said step with the post extending through their central openings, a lateral support located adjacent the turntable to provide a marginal support for records supported on said step, a locking element arranged to lock the magazine element in any of a large number of intermediate positions, means biassing said locking elements towards locking position, a member mounted on said magazine element operatively connected to said locking element and arranged for manual actuation to unlock said locking element, a projectable member located between the turntable and said lateral support and arranged to be projected therebetween, operating elements cooperating with the magazine element to project said projectable member upwardly beyond said lateral support when the magazine element is in intermediate positions and retract it downwardly below said lateral support in the extreme positions of said magazine element, said projectable member being located, in its upward position, to swing the records over the lateral support when the magazine element is moved downwardly towards operating position, and a member pivotally carried by the magazine element arranged to apply pressure on the stack of records to hold the stack against the lateral support and seat.

3. In an automatic phonograph, in combination, a turntable having a centrally located spindle, a swinging magazine element pivotally mounted on a generally horizontal axis adjacent said turntable and arranged to occupy a position above said turntable, a post carried by said element and extending downwardly into alignment with the turntable spindle, a record supporting step on said post, said magazine element being arranged to be swung upwardly about its axis to elevate the post away from the spindle so that a stack of records may be applied to said post to rest on said step with the post extending through their central openings, a lateral support located adjacent the turntable to provide marginal support for records supported on said step, a locking element arranged to lock the magazine element in any of a large number of intermediate positions, means biassing said locking element towards locking position, a member mounted on said magazine element operatively connected to said locking element and arranged for manual actuation to unlock said locking element, a counterpoise tending to elevate the magazine so as to counterpoise the weight of the stack of records during the downward movement of the loaded magazine element, a projectable member located between the turntable said lateral support and arranged to be projected upwardly therebetween, operating elements cooperating with the magazine element to project said projectable member upwardly beyond said lateral support when the magazine element is in intermediate positions and retract it downwardly below said lateral support in the extreme positions of said magazine element, said projectable member being located, in its upward position, to swing the records over the lateral support when the magazine element is moved downwardly towards its operating position, and a member pivotally carried by the magazine element arranged to apply pressure on the stack of records to hold the stack against the lateral support and seat.

4. In an automatic phonograph, in combination, a turntable, a lateral support mounted adjacent the turntable for supporting a stack of records above said turntable to be dropped seriatim onto the turntable for reproduction, a movable abutment mounted adjacent said support, operative elements for actuating said abutment to displace the lowermost record of the stack in its plane and initiate its removal off the support, said abutment being located for peripheral engagement with the lowermost record and to pass freely below the next higher record, and an element for moving said abutment upwardly after a slight displacement of the lowermost record to elevate the records above the lowermost record whereby the lowermost record is provided with free space between the lateral support and the record above the lowermost record to permit free lateral displacement of the lowermost record clear of the lateral support.

5. In an automatic phonograph, in combination, a turntable, a lateral support mounted adjacent the turntable for supporting a stack of records above said turntable to be dropped seriatim onto the turntable for reproduction, a movable abutment mounted adjacent said support, operative elements for actuating said abutment to displace the lowermost record of the stack in its plane and initiate its removal off the support, said abutment being located for peripheral engagement with the lowermost record and to pass freely below the next higher record, an element on said abutment arranged to move below and to engage the underside of the lowermost record, said abutment being deeper than the thickness of a record, and an element for moving said abutment upwardly to elevate the lowermost record and to elevate the records above the lowermost record whereby the marginal portion of the lowermost record previously supported by the lateral support is located in spaced relation to the lateral support and to the record above the lowermost record to permit free lateral displacement of the lowermost record clear of the lateral support.

6. In an automatic phonograph, in combination, a turntable, a lateral support mounted adjacent the turntable for supporting a stack of records above said turntable to be dropped seriatim onto the turntable for reproduction, a supporting element providing rotatable support for said lateral support, operative elements for oscillating said support about its axis to effect discharge of the lowermost record, a plunger carried by said lateral support normally located to engage the periphery of the lowermost record on said support to displace it in its plane and effect its discharge and to pass freely below the next higher record, and an element for moving said plunger upwardly after a slight displacement of the lowermost record to elevate the records above the lowermost record clear of the lowermost record whereby the lowermost record is provided with free space between the lateral support and the record above the lowermost record to facilitate the discharge of the lowermost record from the lateral support.

7. In an automatic phonograph, in combination, a turntable, a lateral support mounted adjacent the turntable for supporting a stack of records above said turntable to be dropped seriatim onto the turntable for reproduction, a supporting element providing rotatable support for said lateral support, operative elements for oscillating said support about its axis to effect discharge of the lowermost record, a plunger carried by said lateral support, said plunger having a shoulder and a projection thereabove, said projection being deeper than the record with which the plunger cooperates, said plunger being normally located so that the plunger projects above the surface of the lateral support less than the thickness of a record so that it initially engages the periphery of the lowermost record only to effect its displacement in its plane, and an element for moving said plunger upwardly after a slight displacement of the lowermost record in its plane whereby the records above the lowermost record are elevated by said projection clear of the lowermost record and the lowermost record is elevated above the surface of the lateral support by said shoulder to provide free space between the lateral support and the record above the lowermost record to facilitate the discharge of the lowermost record from the lateral support.

8. In an automatic phonograph, in combination, a turntable, a post having its lower portion extending upwardly from the axis of the turntable, a record supporting step on said post, a lateral support mounted adjacent said turntable to provide marginal support for a stack of records resting on said step with the post extending through their central openings, a movable abutment located adjacent said lateral support and arranged to engage the periphery of, and move the lowermost record off the step, said abutment being normally arranged to pass freely below the records above the lowermost record on said support, operative means for moving said abutment towards the post, and means for moving said abutment upwardly after a slight displacement of the lowermost record to elevate the records above the lowermost record whereby the lowermost record is provided with free space between the lateral support and the record above the lowermost record, the portion of the post below the step sloping downwardly from the step and away from the lateral support whereby the downward movement of the discharging record after clearing the step causes the discharging record to move laterally out of the free space and away from the lateral support.

9. In an automatic phonograph, in combination, a turntable, a post having its lower portion extending upwardly from the axis of the turntable, a record supporting step on said post, a lateral support mounted adjacent said turntable to provide marginal support for a stack of records resting on said step with the post extending through their central openings, a pair of movable abutments located adjacent said lateral support operative elements operatively connected to said abutments to move same towards the post, one of these abutments being arranged to engage the periphery of, and move a lowermost record of smaller size towards the post and off the step, the other abutment being arranged to engage the periphery of, and move a lowermost record of larger size off the step, said abutments being normally arranged to pass freely below the records above the lowermost record on said lateral support, and means for moving said other abutment upwardly after a slight displacement of a lowermost record of larger size to elevate a record of larger size which may be above the lowermost record whereby the lowermost record is provided with free space between the lateral support and the record above the lowermost record before its discharge, the portion of the post below the step sloping downwardly from the step and away from the lateral support whereby the downward movement of the discharging record on the post after clearing the step causes the discharging record to move laterally away from the lateral support.

10. In an automatic phonograph, in combination, a turntable, a post having its lower portion extending upwardly from the axis of the turntable, a record supporting step on said post, a lateral support mounted adjacent said turntable to provide marginal support for a stack of records resting on said step with the post extending through their central openings, an abutment located adjacent said support and arranged to engage the periphery of the lowermost record on the support, said abutment being deeper than a record thickness, operating elements operatively connected to said abutment for moving it towards the post, said abutment being normally arranged to pass below the next higher record, an element carried by said abutment normally located to pass below and to engage the underside of the lowermost record, and operated elements arranged to move said abutment upwardly during its movement towards the post whereby the element carried by the abutment elevates the lowermost record and the abutment elevates the records above the lowermost record whereby the marginal portion of the lowermost record previously supported by the lateral support is located in spaced relation to the lateral support and to the record above the lowermost record, the portion of the post below the step sloping downwardly and away from the lateral support whereby the downward movement of the discharging record on the post after it has cleared the step moves the discharging record laterally away from the lateral support.

MAHLON W. KENNEY.
CARL G. JOHNSON.

REFERENCES CITED

The following references are of record in the file of this patent:

UNITED STATES PATENTS

| Number | Name | Date |
|---|---|---|
| 1,931,487 | Collison et al. | Oct. 24, 1933 |
| 2,017,898 | Gates | Oct. 22, 1935 |
| 2,099,728 | Duncan | Nov. 23, 1937 |
| 2,228,568 | Johnson | Jan. 14, 1941 |
| 2,237,340 | Downs | Apr. 8, 1941 |
| 2,307,031 | Erwood | Jan. 5, 1943 |
| 2,435,264 | Ansar | Feb. 3, 1948 |

FOREIGN PATENTS

| Number | Country | Date |
|---|---|---|
| 554,553 | Great Britain | July 8, 1943 |